United States Patent
Zhang

(10) Patent No.: US 11,679,357 B2
(45) Date of Patent: Jun. 20, 2023

(54) MUTUAL SWITCHING TYPE COMPRESSED AIR PURIFICATION APPARATUS

(71) Applicant: ZHUHAI HECA PURIFICATION TECHNOLOGY CO., LTD., Guangdong (CN)

(72) Inventor: Yu Zhang, Guangdong (CN)

(73) Assignee: ZHUHAI HECA PURIFICATION TECHNOLOGY CO., LTD, Guangdong (CN)

( * ) Notice: Subject to any disclaimer, the term of this patent is extended or adjusted under 35 U.S.C. 154(b) by 489 days.

(21) Appl. No.: 16/970,300

(22) PCT Filed: Mar. 29, 2019

(86) PCT No.: PCT/CN2019/080346
§ 371 (c)(1),
(2) Date: Aug. 14, 2020

(87) PCT Pub. No.: WO2019/196676
PCT Pub. Date: Oct. 17, 2019

(65) Prior Publication Data
US 2021/0023501 A1    Jan. 28, 2021

(30) Foreign Application Priority Data

Apr. 11, 2018  (CN) .......................... 201810320877.7

(51) Int. Cl.
*B01D 53/04*    (2006.01)
*B01D 53/26*    (2006.01)
*B01D 46/00*    (2022.01)

(52) U.S. Cl.
CPC ....... *B01D 53/261* (2013.01); *B01D 46/0036* (2013.01); *B01D 53/0415* (2013.01);
(Continued)

(58) Field of Classification Search
CPC .............. B01D 53/261; B01D 53/0415; B01D 53/0446; B01D 53/04; B01D 2257/80;
(Continued)

(56) References Cited

U.S. PATENT DOCUMENTS 3,659,399 A * 5/1972 Kauer, Jr. ............ B01D 53/047
95/122
4,806,134 A * 2/1989 Lhota ................. B01D 53/0454
55/DIG. 17

(Continued)

FOREIGN PATENT DOCUMENTS

CN    205683813 U    11/2016
CN    206206625 U    5/2017
(Continued)

OTHER PUBLICATIONS

CNIPA, First Office Action for 201810320877.7, dated Oct. 10, 2019.
(Continued)

*Primary Examiner* — Frank M Lawrence, Jr.
(74) *Attorney, Agent, or Firm* — Lippes Mathias LLP

(57) ABSTRACT

Disclosed is a mutual switching type compressed air purification apparatus, comprising a main intake pipe, a main exhaust pipe, two vent valve assemblies, two drying cylinders and a solenoid valve. The main intake pipe is connected to the two vent valve assemblies of which inlet holes are communicated with the corresponding drying cylinders respectively, and air outlets of the drying cylinders are respectively connected to the main exhaust pipe. The solenoid valve is connected to a first pilot air hole of the first vent valve assembly, and also connected to a second pilot air hole of the second vent valve assembly to control the opening and
(Continued)

closing of the vent valves, and valve cores of the solenoid valve are switched between a first valve position and a second valve position.

11 Claims, 9 Drawing Sheets

(52) U.S. Cl.
CPC ...... *B01D 53/0446* (2013.01); *B01D 2257/80* (2013.01); *B01D 2259/402* (2013.01); *B01D 2259/40003* (2013.01)

(58) Field of Classification Search
CPC .... B01D 2259/40003; B01D 2259/402; B01D 46/0036; B01D 46/2407; B01D 46/62
USPC ......... 95/117–122; 96/121, 134; 34/80, 472, 34/473
See application file for complete search history.

(56) References Cited

U.S. PATENT DOCUMENTS

| | | | | |
|---|---|---|---|---|
| 5,858,063 | A | * | 1/1999 | Cao ........................ B64D 10/00 96/111 |
| 2012/0031273 | A1 | * | 2/2012 | Heer ..................... B60T 17/004 96/115 |
| 2017/0095767 | A1 | * | 4/2017 | Miehe .................. B01D 53/261 |
| 2021/0046419 | A1 | * | 2/2021 | Wright ................ B01D 53/261 |

FOREIGN PATENT DOCUMENTS

| | | |
|---|---|---|
| CN | 107485984 A | 12/2017 |
| CN | 107854975 A | 3/2018 |
| CN | 108404614 A | 8/2018 |
| EP | 272738 A2 * | 6/1988 |

OTHER PUBLICATIONS

CNIPA, Second Office Action for 201810320877.7, dated Apr. 29, 2020.

WIPO, Written Opinion of the International Search Authority for PCT/CN2019/080346, dated Jun. 20, 2019.

WIPO, International Search Report for PCT/CN2019/080346, dated Jun. 20, 2019.

* cited by examiner

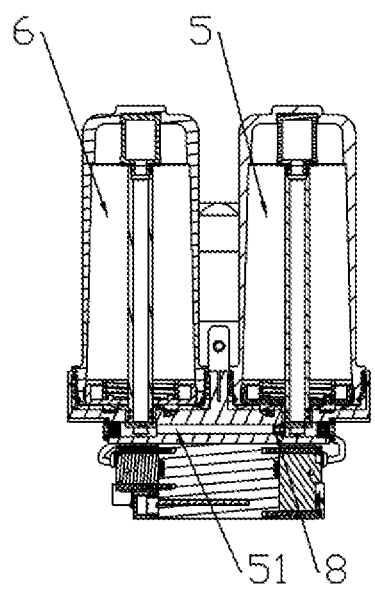
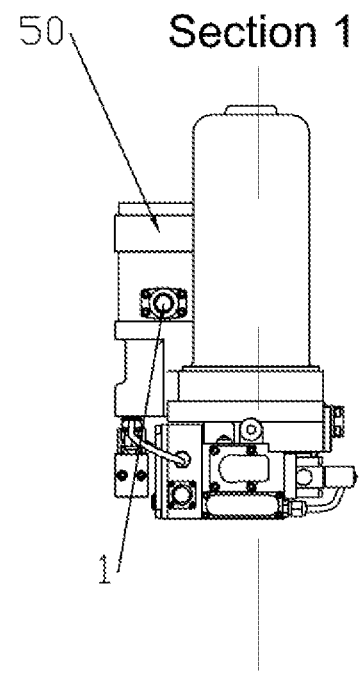
FIG. 8   FIG. 9

MUTUAL SWITCHING TYPE COMPRESSED AIR PURIFICATION APPARATUS

CROSS-REFERENCE TO RELATED APPLICATION

This application is filed on the basis of Chinese patent application No. 201810320877.7 filed Apr. 11, 2018, and PCT application PCT/CN2019/080346 filed Mar. 29, 2019, and claims priority of the patent applications, the entire contents of which are incorporated herein by reference.

TECHNICAL FIELD

The present invention relates to the technical field of air purification, and in particular, to a mutual switching type compressed air purification apparatus.

BACKGROUND

In the existing art, common compressed air purification apparatuses, for example, in Publication No.: CN107485984A, a double-sided interlocking adsorption type dryer adopting end face sealing form may realize stable and reliable switching on one side by using a two-position three-way valve. However, the switching on the other side by changing their internal pressure has defects of: 1. low success rate of switching due to unstable change of internal pressure; 2. failure to switch in accordance with time sequence requirements due to lag of internal pressure change.

SUMMARY

The aim of the invention is to solve the above technical problems by providing a mutual switching type compressed air purification apparatus.

The mutual switching type compressed air purification apparatus of the invention, comprising a main intake pipe, a main exhaust pipe, a first vent valve assembly, a second vent valve assembly, a first drying cylinder, a second drying cylinder and a solenoid valve. The main intake pipe is connected to the first vent valve assembly and the second vent valve assembly, a first inlet hole of the first vent valve assembly is communicated with the first drying cylinder while a second inlet hole of the second vent valve assembly is communicated with the second drying cylinder, and a first air outlet of the first drying cylinder and a second air outlet of the second drying cylinder are both connected to the main exhaust pipe. The solenoid valve is connected to a first pilot air hole of the first vent valve assembly, and also connected to a second pilot air hole of the second vent valve assembly to restrict the pilot air holes and control the opening and closing of the vent valves. Valve cores of the solenoid valve are switched between a first valve position and a second valve position, so that compressed air is introduced into the first pilot air hole and the second pilot air hole in sequence, and one of the two holes, into which the compressed air is introduced later, can release pressure to the solenoid valve; and the first air outlet and the second air outlet are communicated with each other through a regeneration pipe. The solenoid valve is a two-position three-way solenoid valve with valve cores switching between the first valve position and the second valve position, thus realizing the control function of the two-position five-way valve. Thus, it is ensured that pilot air is introduced into one of the first vent valve assembly and the second vent valve assembly at respective switching time points, so that an airflow passage of the vent valve assembly is opened according to time sequence requirements to discharge waste gas generated in the adsorbent regeneration process in the drying cylinder on this side. At the same time, pilot air is discharged from the other vent valve assembly so that an airflow passage of the other vent valve assembly is closed according to the time sequence requirements, and the air in the main intake pipe is routed to the drying cylinder on this side and dried. The operations on two sides may be switched back and forth to realize a gas drying function of each drying cylinder and a regeneration function of the adsorbent in the drying cylinder.

Further, a second valve core of the solenoid valve is switched between two valve positions, so that the compressed air is discharged from compressed air chambers of the second vent valve assembly and the first vent valve assembly in sequence; the air is introduced into one of the compressed air chambers of the second vent valve assembly and the first vent valve assembly and is discharged from the other one. When the air is introduced into the compressed air chamber of the second vent valve assembly, the air may be fed to the second drying cylinder and dried. When the air is discharged from the compressed air chamber of the first vent valve assembly, the waste gas from regeneration in the first drying cylinder may be discharged, and vice versa. The operations on two sides can be switched back and forth.

Further, a regeneration throttle valve (such as a regeneration screw plug) communicated with the solenoid valve is disposed in the regeneration pipe. The regeneration throttle valve can limit the quantity of air required to avoid waste of air source.

Further, a multifunctional drying filter, which can implement rough purification of air to ensure that air entering the main intake pipe is relatively clean, is disposed at the main intake pipe.

Further, the first drying cylinder and/or the second drying cylinder are/is compressed air drying filter cartridge(s) with inner intaking and outer venting, which have (has) a first cartridge body. The first cartridge body is internally provided with a second cartridge body and a dust filter element, and is connected to the second cartridge body through an annular base, an annular seal washer and a second cartridge bottom cover at a lower part within the first cartridge body, and an air inlet passage is disposed at the bottom of the second cartridge body. The dust filter element is located on a filter element mounting base mounted on the top of the second cartridge body, and is mounted above the filter element mounting base and communicated with the top of the second cartridge body. Adsorbent is filled in the second cartridge body with cyclone filler to a certain level. There is a gap between the first cartridge body and the second cartridge body to form an air outlet passage having an air inlet communicated with the dust filter element. To solve the above technical problems, a compressed air drying filter cartridge featured with fewer parts, high integration, good filtering effect and easy installation and maintenance is provided.

A cartridge cover on the top of the second cartridge body is of a filter screen structure, the filter element mounting base provided with a central hole is detachably mounted on the top of the second cartridge body in a snap-fit and/or threaded manner, and a neck-shaped opening of the dust filter element is embedded into the central hole of the filter element mounting base and is sealed and mounted through a filter element sealing ring.

The adsorbent is pressed against and positioned by a lower filter disc thereunder and a compression spring under the lower filter disc, the second cartridge bottom cover is detachably disposed at the bottom of the second cartridge body in a snap-fit and/or threaded manner, and is pressed against a lower end of the compression spring so that upper and lower ends of the compression spring are pressed against the second cartridge bottom cover and the lower filter disc, respectively. The air inlet passage is communicated with the second cartridge body through an opening, preferably a central hole, of the second cartridge bottom cover.

The air inlet passage below the second cartridge body is formed by the annular base and the annular seal washer, the second cartridge bottom cover is detachably disposed at the bottom of the second cartridge body in a snap-fit and/or threaded manner, and the annular base is mounted below the second cartridge bottom cover and is sealed by the annular seal washer with an L-shaped cross section. A transverse part of the annular seal washer is padded between the second cartridge bottom cover and the annular base, and a vertical part of the annular seal washer is tightly attached upward along a wall of the opening of the second cartridge bottom cover. The air inlet passage is communicated with an inner chamber of the second cartridge body through the opening of the second cartridge bottom cover.

Alternatively, the air inlet passage below the second cartridge body is formed by the annular base and the annular seal washer, and the second cartridge bottom cover is detachably disposed at the bottom of the second cartridge body in a snap-fit and/or threaded manner. The air inlet passage is communicated with the second cartridge body through the second cartridge bottom cover, and is communicated with the second cartridge body through an opening, preferably a central hole, of the second cartridge bottom cover.

The annular base is mounted at the bottom of the first cartridge body through a sealing ring assembly thereunder.

An air outlet hole, which is connected to the air outlet passage formed between the first cartridge body and the second cartridge body, is formed on the annular base.

An MCU controller is disposed outside the first cartridge body, an airflow sensor is disposed inside a cavity formed between the dust filter element and the filter element mounting base and the first cartridge body, and a humidity sensor is also disposed inside the dust filter element. The airflow sensor and the humidity sensor are both electrically connected to the MCU controller which is also electrically connected to an airflow indicator light and a humidity indicator light.

The first cartridge body and the second cartridge body are coaxial cylinders, and the air outlet passage has a radial section in the shape of a ring, preferably coaxial and uniform ring.

Further, the first vent valve assembly comprises a first vent chamber, a first piston seal, a first spring, a first sealing rod and a first sealing valve plate. The first vent chamber comprises a first pilot chamber and a first intake chamber, the first pilot air hole is communicated with the first pilot chamber, and the main intake pipe is communicated with the first inlet hole through the first intake chamber. One end of the first sealing rod is connected to the first piston seal located in the first pilot chamber. The first spring, having a bottom end in contact with the first piston seal, is coiled around the first sealing rod, and the other end of the first sealing rod is connected to the first sealing valve plate located in the first intake chamber.

Further, the second vent valve assembly and the first vent valve assembly are symmetrically mounted with the same parts and in the same connection manner.

Further, the first valve core of the solenoid valve is switched between the two valve positions so that the first intake chamber is communicated with and disconnected from a first exhaust pipe, and the second intake chamber is also communicated with and disconnected from a second exhaust pipe accordingly.

Further, the first vent valve assembly is provided with a first vent hole, and the second vent valve assembly is provided with a second vent hole. The first vent hole and the second vent hole are both communicated with a vent pipe and lead to a vent silencer.

Further, the first vent valve assembly or the second vent valve assembly comprises a valve plate with a convex sealing structure assembled in combination, comprising a sealing rod. A stopper, which is fixed on the sealing rod, is fitted with a supporting valve plate, a convex sealing ring is mounted in a groove at an upper end of the supporting valve plate, a pressure plate is mounted on a pressure surface of the convex sealing ring, and the pressure plate has a detachable fastener disposed on an upper end face thereof to fasten the pressure plate, the convex sealing ring and the supporting valve plate on the sealing rod. Therefore, the sealing ring may be replaced and other parts may be reused.

According to the valve plate with a convex sealing structure assembled in combination, a pressure cone of the pressure plate is detachably mounted on an inner cone of the convex sealing ring. The pressure cone of the pressure plate has a maximum outer diameter ⌀A slightly greater than a maximum inner diameter ⌀a of the inner cone of the convex sealing ring and an angle $\angle \alpha$ equal to an angle $\angle b$ of the inner cone of the convex sealing ring According to the valve plate with a convex sealing structure assembled in combination, a radial supporting plane of the pressure plate is detachably mounted within an inner diametral plane of the convex sealing ring, and the radial supporting plane has a diameter ⌀B slightly greater than a diameter ⌀b of the inner diametral plane of the convex sealing ring.

According to the valve plate with a convex sealing structure assembled in combination, the pressure plate is required to have a thickness Y of equal to a thickness y of the convex sealing ring, and the pressure plate is required to have a thickness H less than a thickness h of the convex sealing ring.

According to the valve plate with a convex sealing structure assembled in combination, the convex sealing ring with the thickness h is required to have a compression amount not less than 20% after assembly.

According to the valve plate with a convex sealing structure assembled in combination, an angle $\angle \beta$ of an outer cone of the convex sealing ring is equal to an angle $\angle \theta$ of a supporting cone in the groove of the supporting valve plate, and the outer cone of the convex sealing ring has a maximum outer diameter ⌀a slightly greater than a maximum inner diameter ⌀c of the supporting cone in the groove of the supporting valve plate.

According to the valve plate with a convex sealing structure assembled in combination, a sealing ring is disposed between the pressure plate and the sealing rod.

According to the valve plate with a convex sealing structure assembled in combination, the detachable fastener is connected in a snap-fit or threaded manner.

According to the valve plate with a convex sealing structure assembled in combination, a detachable flat gasket is disposed between the detachable fastener and the pressure plate.

According to the valve plate with a convex sealing structure assembled in combination, the convex sealing ring is a round, square or other special-shaped sealing ring.

Compared with the prior art, the mutual switching type compressed air purification apparatus has the beneficial effects as follows: 1. The solenoid valve controls the first pilot air chamber of the first vent valve assembly and the second pilot air chamber of the second vent valve assembly to take in and discharge air, respectively, and the pressure of the pilot air on both sides is stable, so the success rate of switching the first vent valve assembly and the second vent valve assembly is high. 2. The solenoid valve controls the internal pressure to change on time and without lag, so the switching is implemented according to the time sequence requirements.

BRIEF DESCRIPTION OF THE DRAWINGS

The specific embodiments of the present invention will be further described in detail with reference to the accompanying drawings, in which:

FIG. 8 is a sectional view of a section 1 according to the present invention;

FIG. 9 is an external side view according to the present invention;

In the drawings:

Figure 1:
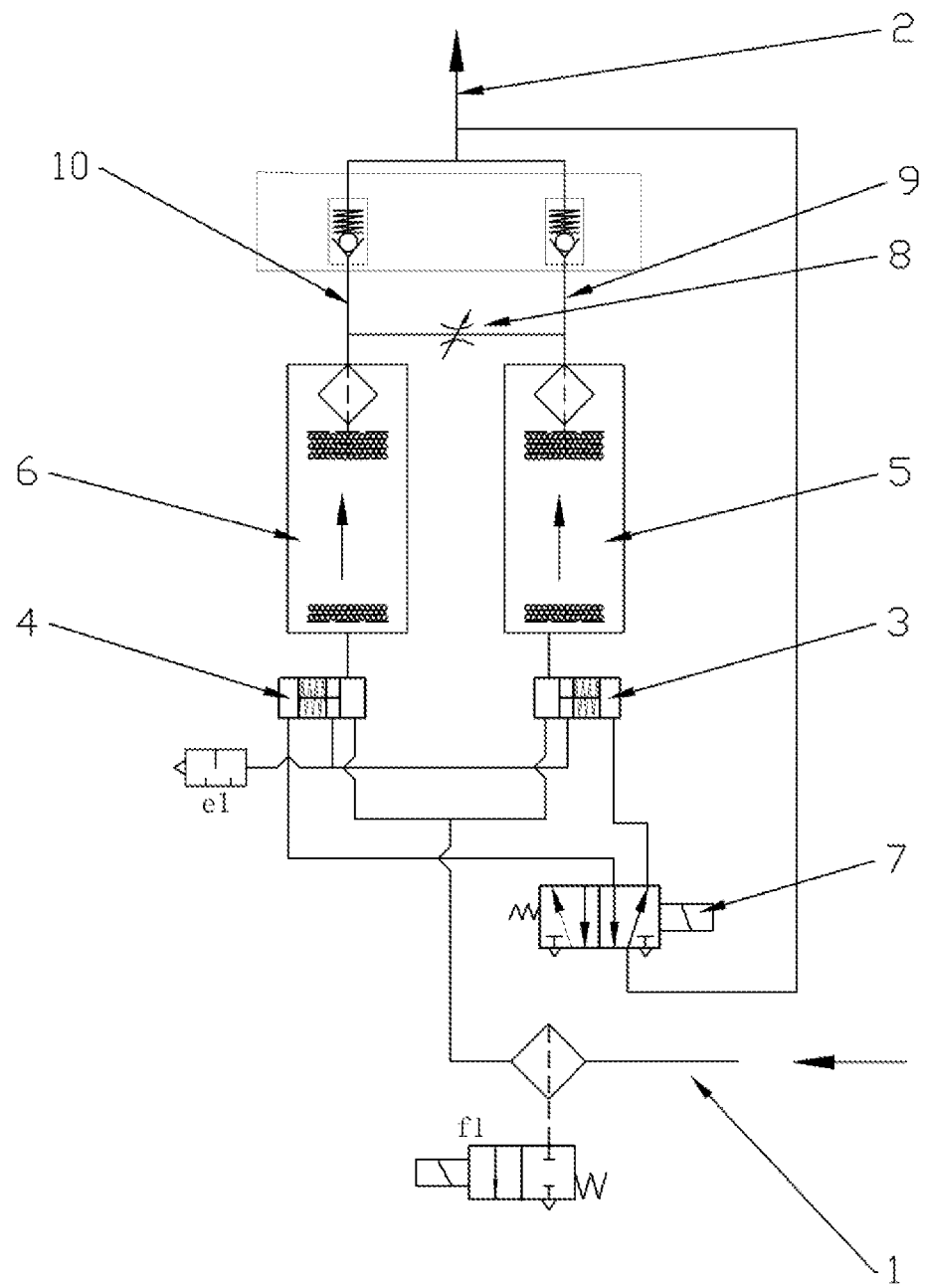
FIG. 1 is a schematic diagram of an initial shutdown state according to the present invention.
Figure 2:
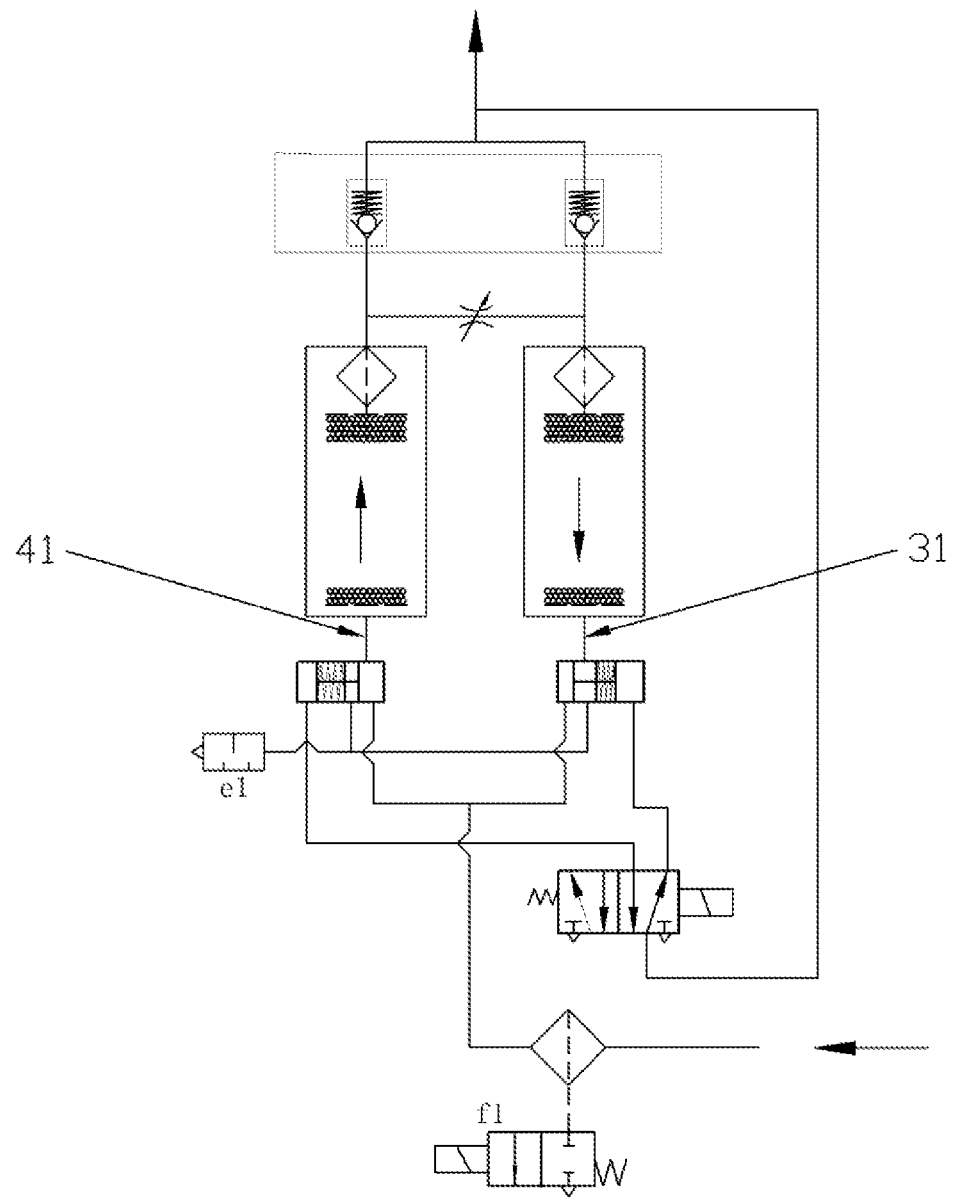
FIG. 2 is a schematic diagram of an off-position of a solenoid valve during air charging according to the present invention.
Figure 3:
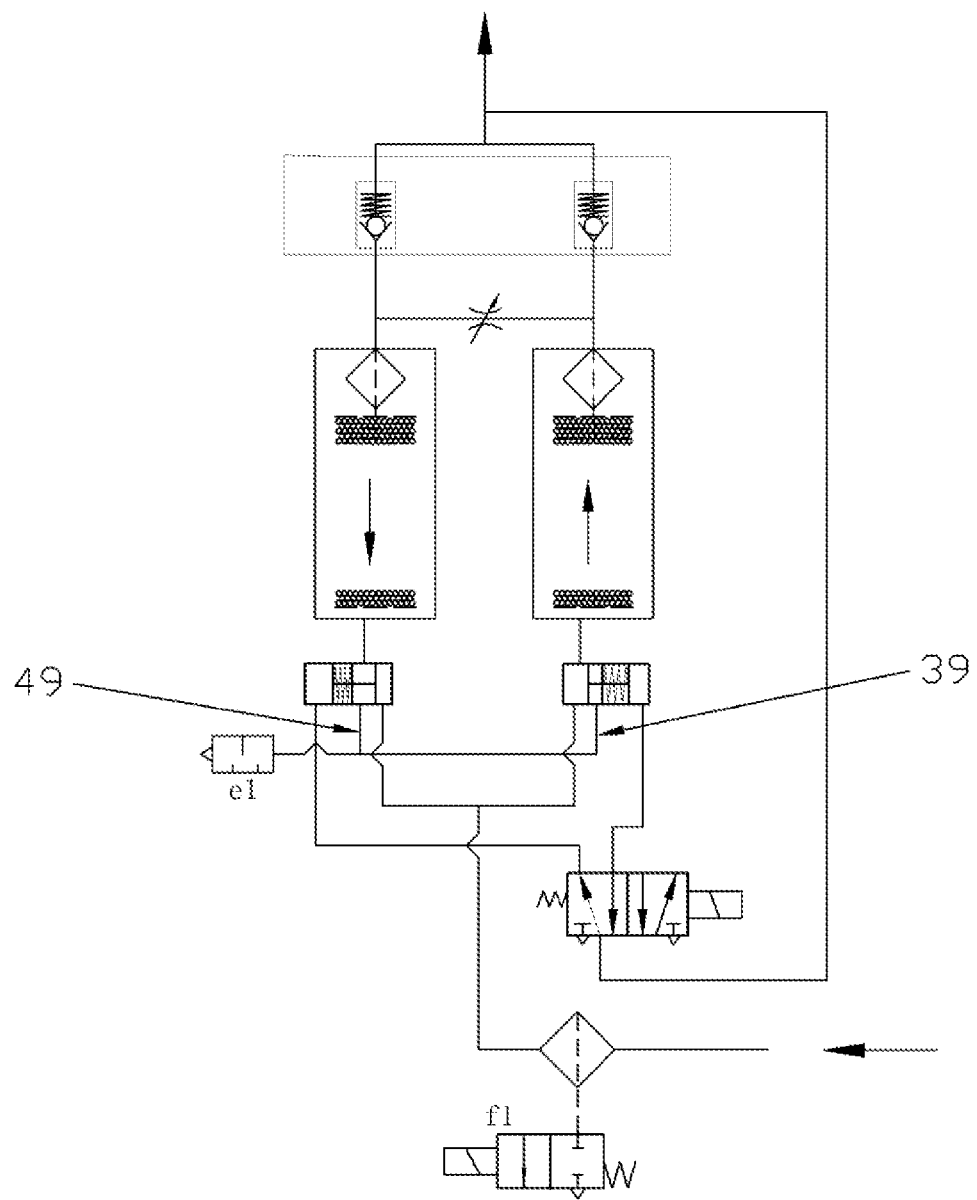
FIG. 3 is a schematic diagram of an on-position of the solenoid valve during air charging according to the present invention.
Figure 4:
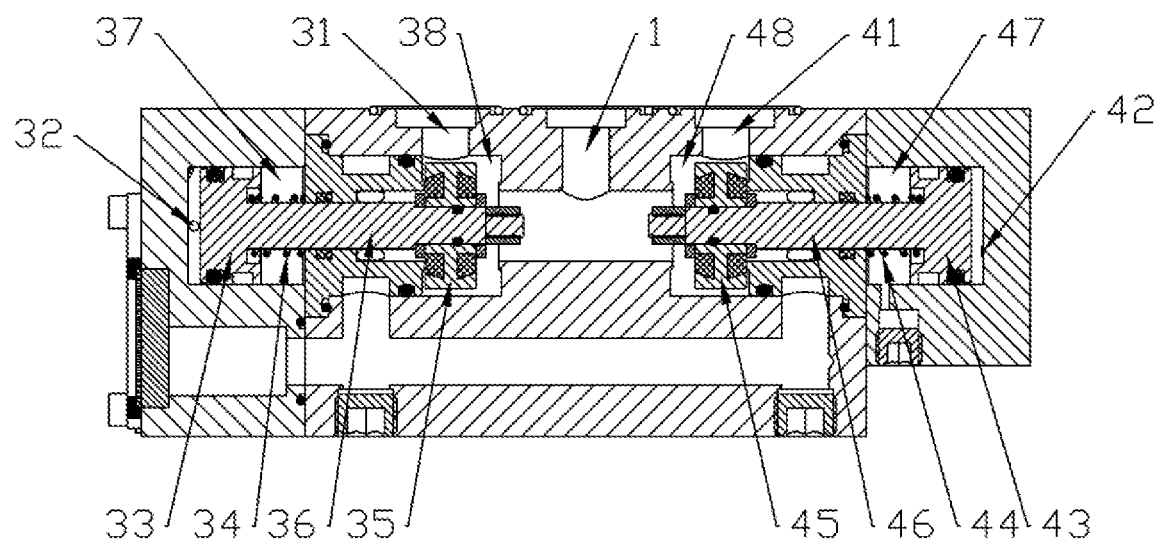
FIG. 4 is a schematic diagram of an initial shutdown state of a first vent valve assembly and a second vent valve assembly.
Figure 5:
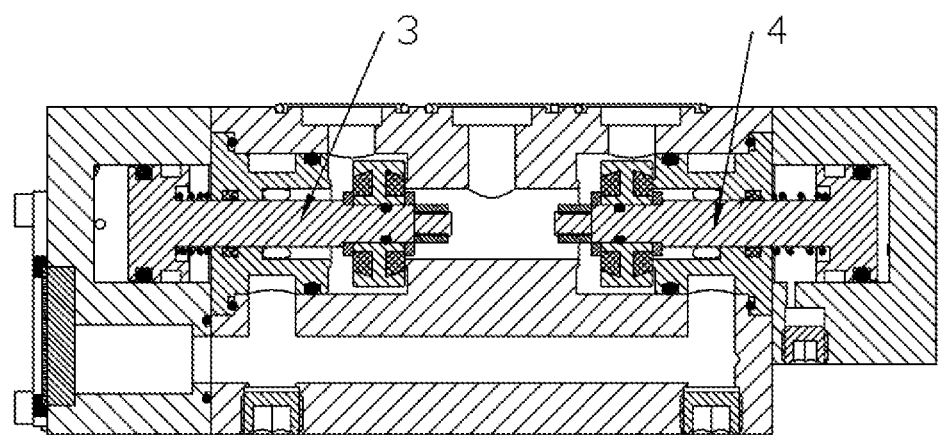
FIG. 5 is a schematic diagram of an off-position of the solenoid valve during air charging of the first vent valve assembly and the second vent valve assembly.
Figure 6:
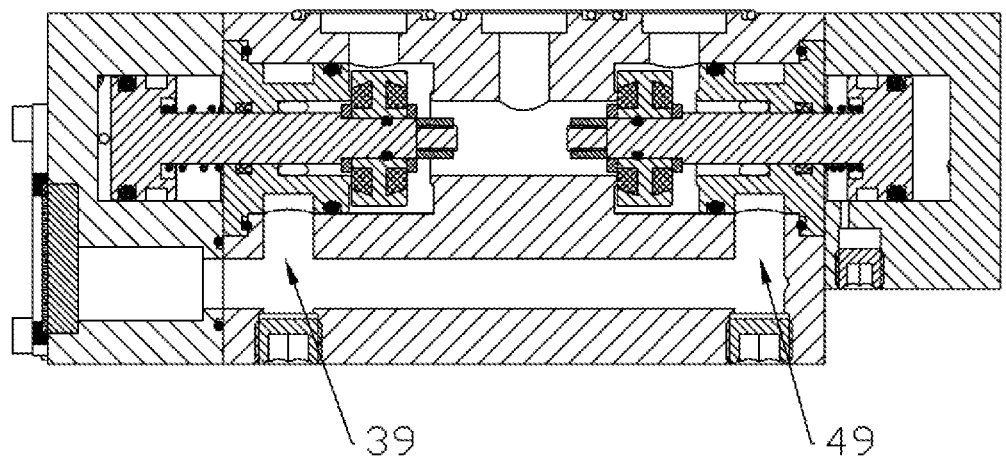
FIG. 6 is a schematic diagram of an on-position of the solenoid valve during air charging of the first vent valve assembly and the second vent valve assembly.
Figure 7:
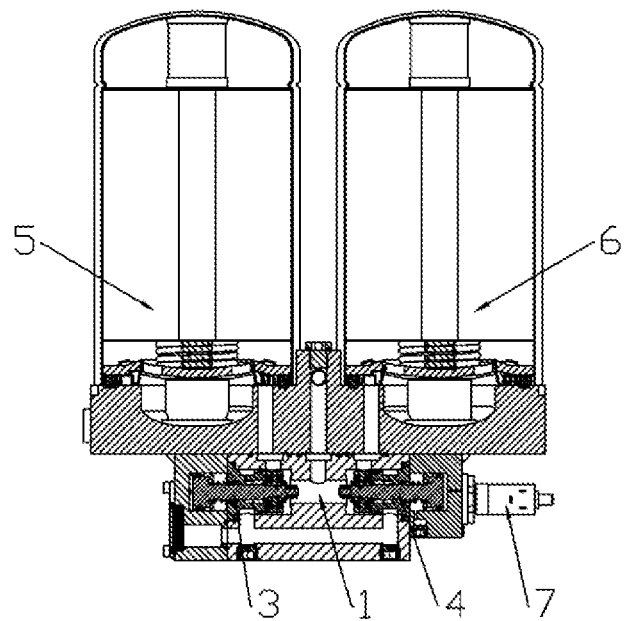
FIG. 7 is a sectional view according to the present invention.

1—main intake pipe; 2—main exhaust pipe; 3—first vent valve assembly; 4—second vent valve assembly; 5—first drying cylinder; 6—second drying cylinder; 7—solenoid valve; 8—regeneration throttle valve; 31—first inlet hole; 32—first pilot air hole; 33—first piston seal; 34—first spring; 35—first sealing valve plate; 36—first sealing rod; 37—first pilot chamber; 38—first intake chamber; 39—first vent hole; 41—second inlet hole; 42—second pilot air hole; 43—second piston seal; 44—second spring; 45—second sealing valve plate; 46—second sealing rod; 47—second pilot chamber; 48—second intake chamber; 49—second vent hole; 50—multifunctional drying filter; 51—regeneration pipe; 201—first cartridge body; 202—dust filter element; 203—filter element sealing ring; 204—filter element mounting base; 205—adsorbent; 206—second cartridge body; 207—lower filter disc; 208—compression spring; 209—annular base; 2010—sealing ring assembly; 2011—annular seal washer; 2012—second cartridge bottom cover; 301—sealing rod; 302—sealing ring 302; 303—supporting valve plat; 304—convex sealing ring; 305—pressure plate; 306—fastener; and 307—flat gasket.

DETAILED DESCRIPTION

As shown in FIGS. 1 to 9, a mutual switching type compressed air purification apparatus according to an embodiment of the present invention comprises a main intake pipe 1, a main exhaust pipe 2, a first vent valve assembly 3, a second vent valve assembly 4, a first drying cylinder 5, a second drying cylinder 6 and a solenoid valve 7. The main intake pipe 1 is connected to the first vent valve assembly 3 and the second vent valve assembly 4, the first vent valve assembly 3 is provided with a first inlet hole 31 which is communicated with the first drying cylinder 5 while the second vent valve assembly 4 is provided with a second inlet hole 41 which is communicated with the second drying cylinder 6, and the first drying cylinder 5 is provided with a first air outlet 9 and the second drying cylinder 6 is provided with a second air outlet 10, both the first air outlet and the second air outlet 10 are connected to the main exhaust pipe 2. The first vent valve assembly 3 has a first pilot air hole 32, and the second vent valve assembly 4 has a second pilot air hole 42. The solenoid valve 7 is connected to the first pilot air hole 32 and the second pilot air hole 42, to restrict the pilot air holes and control the opening and closing of the vent valves. The solenoid valve 7 is provided with valve cores which are switched between a first valve position and a second valve position, such that the compressed air is introduced into the first pilot air hole 32 and the second pilot air hole 42 in sequence, and one of the two, into which the compressed air is introduced later, can release pressure to the solenoid valve 7. The first air outlet 9 and the second air outlet 10 are communicated with each other through a regeneration pipe 51.

Further, the valve cores of the solenoid valve 7 comprises a second valve core, the second valve core is switched between two valve positions, such that the compressed air is discharged from compressed air chambers of the second vent valve assembly 4 and the first vent valve assembly 3 in sequence. The air is introduced into one of the compressed air chambers of the second vent valve assembly 4 and the first vent valve assembly 3 and is discharged from the other one.

Preferably, the regeneration pipe 51 is provided with a regeneration throttle valve 8, for example, a regeneration screw plug, arranged therein and communicated with the solenoid valve 7. The regeneration screw plug can limit the quantity of air required to avoid waste of air source. A small quantity of dried compressed air enters another drying cylinder through a regeneration passage and the regeneration screw plug to regenerate desiccant in the drying cylinder, and the compressed air containing moisture enters a vent passage through a first vent hole 39 or a second vent hole 49 of the intake-exhaust valve assemblies.

Preferably, a multifunctional drying filter 50 is arranged at the main intake pipe 1.

Figure 10:
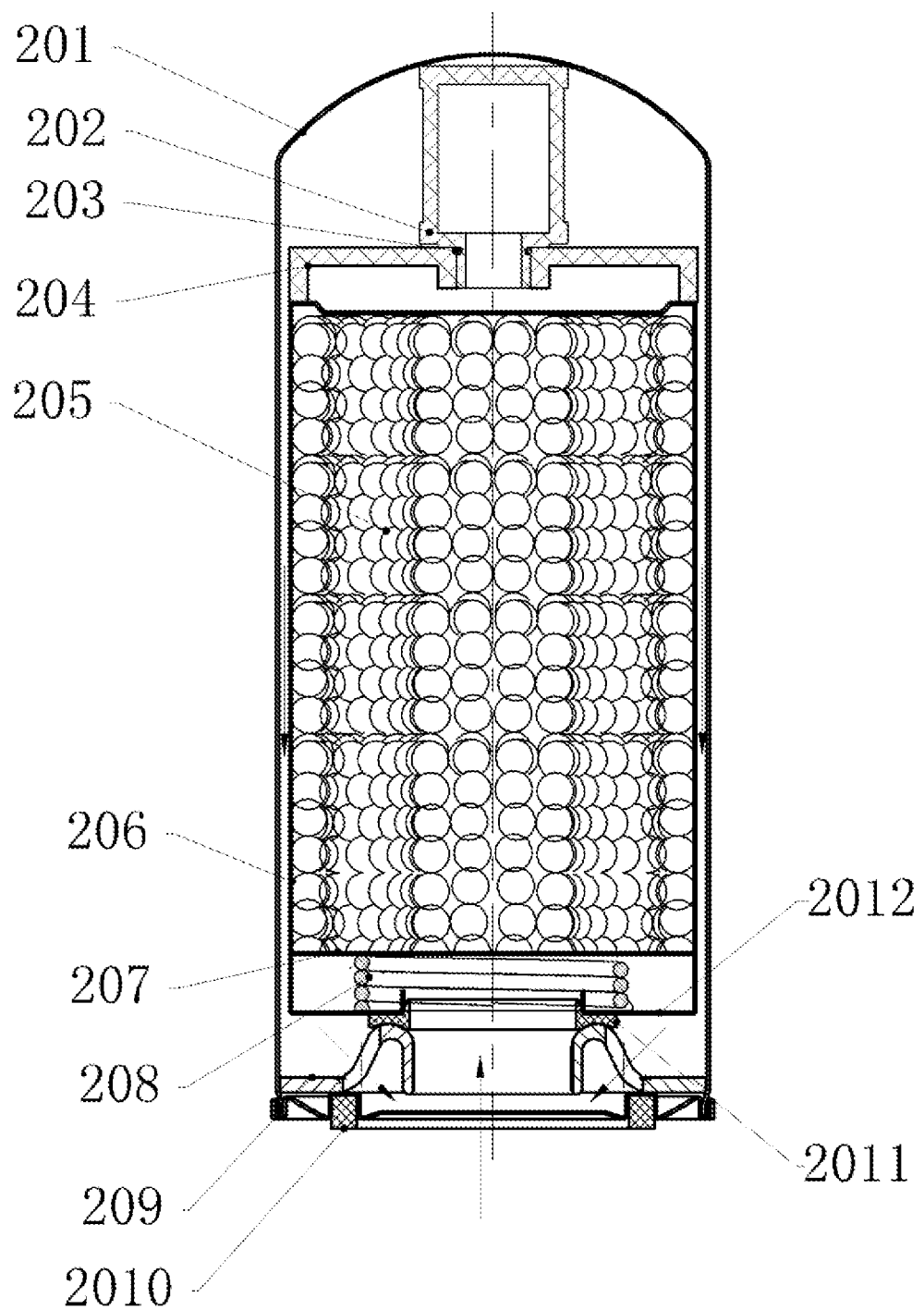
FIG. 10 is a sectional view of a compressed air drying filter cartridge with inner intaking and outer venting.

Preferably, the first drying cylinder 5 and/or the second drying cylinder 6 are/is compressed air drying filter cartridge(s) with inner intaking and outer venting. As shown in FIG. 10, each compressed air drying filter cartridge with inner intaking and outer venting comprises a first cartridge body 201 which is provided with a second cartridge body 206 and a dust filter element 202 therein, and is connected to the second cartridge body 206 through an annular base 209, an annular seal washer 2011 and a second cartridge bottom cover 2012 in its lower interior. An air inlet passage is disposed at the bottom of the second cartridge body 206. The dust filter element 202 is located on a filter element mounting base 204 mounted on the top of the second cartridge body 206, above the filter element mounting base 204. The dust filter element 202 is communicated with the top of the second cartridge body 206, and the second cartridge body 206 is filled with adsorbent 205 with a cyclone filler to a certain level. A gap between the first cartridge body 201 and the second cartridge body 206 forms an air outlet passage having an air inlet communicated with the dust filter element 202.

A cartridge cover on the top of the second cartridge body 206 is of a filter screen structure. Embodiment 1: The filter element mounting base 204 provided with a central hole is detachably mounted on the top of the second cartridge body 206 by nuts and bolts, and a neck-shaped opening of the dust filter element 202 is embedded into the central hole of the filter element mounting base 204, and is sealed and mounted through a filter element sealing ring 203. Embodiment 2: The filter element mounting base 204 provided with a central hole is detachably mounted on the top of the second cartridge body 206 in a snap-fit manner, and a neck-shaped opening of the dust filter element 202 is embedded into the central hole of the filter element mounting base 204, and is sealed and mounted through a filter element sealing ring 203.

Preferably, the adsorbent 205 is pressed against and positioned by a lower filter disc 207 thereunder and a compression spring 208 under the lower filter disc 207. Embodiment 1: The second cartridge bottom cover 2012 is connected to the bottom of the second cartridge body 206 by bolts and nuts, and is pressed against a lower end of the compression spring 208, such that upper and lower ends of the compression spring 208 are pressed against the second cartridge bottom cover 2012 and the lower filter disc 207 respectively. The air inlet passage is communicated with the second cartridge body 206 through the central hole of the second cartridge bottom cover 2012. Embodiment 2: The lower filter disc 207 may be slidable on an inner wall of the second cartridge body 206, so as to compress the adsorbent 205 in the second cartridge body 206 tightly and prevent the movement and crushing of the adsorbent 205 during cyclic switching. Finally, the second cartridge bottom cover 2012 is connected to the bottom of the second cartridge body 206 in a snap-fit manner, and is pressed against a lower end of the compression spring 208 such that upper and lower ends of the compression spring 208 are pressed against the second cartridge bottom cover 2012 and the lower filter disc 207 respectively. The air inlet passage is communicated with the second cartridge body 206 through the central hole of the second cartridge bottom cover 2012.

The annular base 209 is mounted at the bottom of the first cartridge body 201 through a sealing ring assembly 2010 thereunder.

An air outlet hole, which is connected with the air outlet passage formed between the first cartridge body 201 and the second cartridge body 206, is formed on the annular base 209.

An MCU controller is arranged outside the first cartridge body 201, an airflow sensor is arranged inside a cavity formed between the dust filter element 202 and the filter element mounting base 204 and the first cartridge body 201, and a humidity sensor is arranged inside the dust filter element 202. The airflow sensor and the humidity sensor are both electrically connected to the MCU controller which is electrically connected to an airflow indicator light and a humidity indicator light.

The first cartridge body 201 and the second cartridge body 206 are coaxial cylinders, and the radial section of the air outlet passage is in the shape of a ring, preferably coaxial and uniform ring.

During installation, the adsorbent 205 is filled in the second cartridge body 206 with a cyclone filler to a certain level, the lower filter disc 207 is put on the adsorbent 205, the compression spring 208 is put on the lower filter disc 207, and then the adsorbent 205 is pressed against and positioned by the lower filter disc 207 thereunder and the compression spring 208 under the lower filter disc 207. Embodiment 1: The second cartridge bottom cover 2012 is then connected to the bottom of the second cartridge body 206 by bolts and nuts, the filter element mounting base 204 is mounted on the top of the second cartridge body 206 by bolts and nuts, the dust filter element 202 and the filter element mounting base 204 are sealed and mounted through the filter element sealing ring 203, and finally the second cartridge body 206 is mounted on the apparatus by mounting the annular base 209 at the bottom of the first cartridge body 201 through a sealing ring assembly 2010 thereunder. Embodiment 2: The second cartridge bottom cover 2012 is then connected to the bottom of the second cartridge body 206 in a snap-fit manner, the dust filter element 202 and the filter element mounting base 204 are sealed and mounted through the filter element sealing ring 203, and then mounted on the top of the second cartridge body 206 in a snap-fit manner, and finally the second cartridge body 206 is mounted on the apparatus by mounting the annular base 209 at the bottom of the first cartridge body 201 through a sealing ring assembly 2010 thereunder. This assembly method can save assembly time and improve work efficiency.

When in use, a lower portion of the first cartridge body 201 is connected to a dryer base, and the compressed air is diverted into the second cartridge body 206 after flowing through the lower filter disc 207 in the second cartridge body 206, and then flows through the adsorbent 205. The adsorbent 205 may ensure that the air flows evenly through the second cartridge body 206 to prevent tunneling effect. The compressed air after being adsorbed and dried by the adsorbent 205 enters the filter element of the dust filter due to blockage by the filter element mounting base 204, and flows through the dust filter element inside and out to filter out fine particles in the compressed air taken out from the adsorbent 205, and the clean compressed air is discharged through the air outlet passage formed between the first cartridge body 201 and the second cartridge body 206 and finally discharged through the air outlet hole of the annular base 209 to supply air to the apparatus. When the airflow indicator light is on, it indicates that the drying filter cartridge is blocked, and is required to be repaired accordingly. When the humidity indicator light is on, it indicates that the adsorbent 205 of the drying filter cartridge can no longer achieve the drying effect, and is required to be replaced accordingly.

Preferably, the first vent valve assembly 3 comprises a first vent chamber, a first piston seal 33, a first spring 34, a first sealing rod 36 and a first sealing valve plate 35. The first vent chamber comprises a first pilot chamber 37 and a first intake chamber 38, the first pilot air hole 32 is communicated with the first pilot chamber 37, and the main intake pipe 1 is communicated with the first inlet hole 31 through the first intake chamber 38. One end of the first sealing rod 36 is connected to the first piston seal 33 located in the first pilot chamber 37. The first spring 34, having a bottom end in contact with the first piston seal 33, is coiled around the first sealing rod 36, and the other end of the first sealing rod 36 is connected to the first sealing valve plate 35 located in the first intake chamber 38.

Preferably, the second vent valve assembly 4 comprises a second vent chamber, a second piston seal 43, a second spring 44, a second sealing rod 46 and a second sealing valve plate 45. The second vent chamber comprises a second pilot chamber 47 and a second intake chamber 48, the second pilot air hole 42 is communicated with the second pilot chamber 47, and the main intake pipe 1 is communicated with the second inlet hole 41 through the second intake chamber 48. One end of the second sealing rod 46 is connected to the second piston seal 43 located in the second pilot chamber 47. The second spring 44, having a bottom end in contact with the second piston seal 43, is coiled around the second sealing rod 46, and the other end of the second sealing rod 46 is connected to the second sealing valve plate 45 located in the second intake chamber 48.

Preferably, the first valve core of the solenoid valve 7 is switched between the two valve positions such that the first intake chamber 38 is communicated with and disconnected from a first exhaust pipe, and the second intake chamber 48 is also communicated with and disconnected from a second exhaust pipe accordingly.

Preferably, the first vent valve assembly 3 is provided with the first vent hole 39, and the second vent valve assembly 4 is provided with the second vent hole 49. The first vent hole 39 and the second vent hole 49 are both communicated with a vent pipe, such that the air entering the vent passage is discharged through a vent silencer.

Preferably, the first discharge valve assembly 3 or the second discharge valve assembly 4 comprises a valve plate with an assembled convex sealing structure. Therefore, the sealing ring may be replaced and other parts may be reused.

Figure 11:
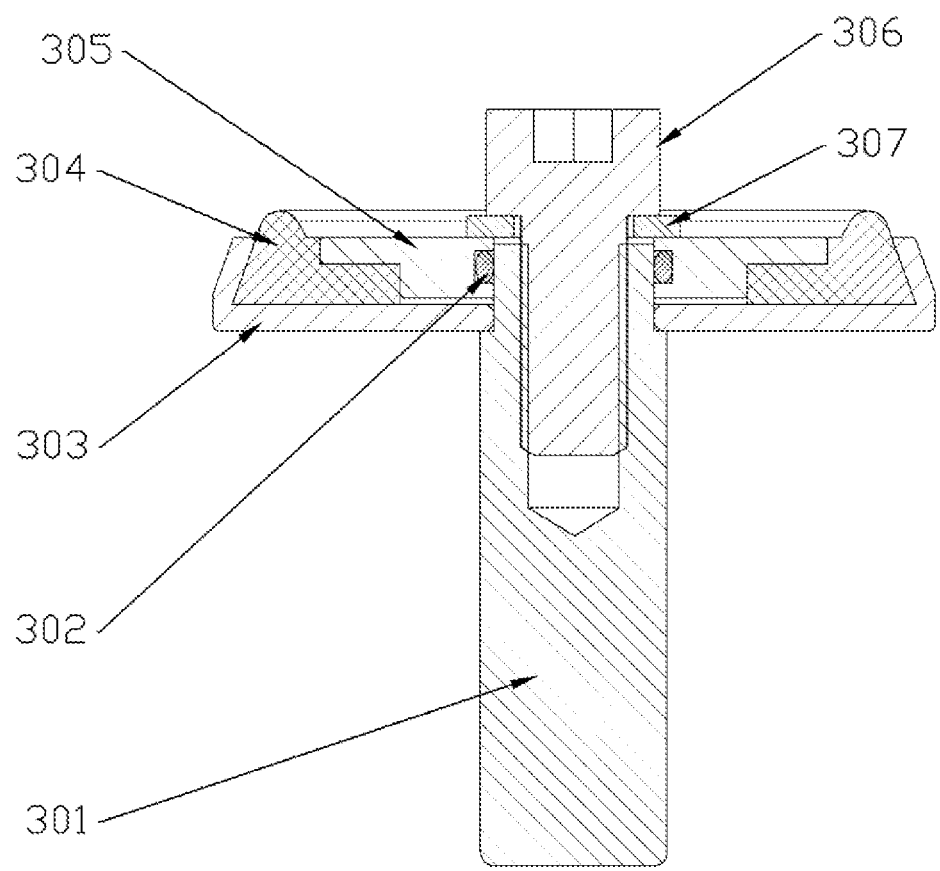
FIG. 11 is a sectional view of a valve plate with an assembled convex sealing structure.

According to Embodiment 1 of the valve plate with an assembled convex sealing structure as shown in FIG. 11, the valve plate is assembled in combination. A stepped shaft surface, on which the supporting valve plate 303 is detachably mounted, is fixed at an appropriate position of one end of the sealing rod 301 which is machined with internal threads, and the convex sealing ring 304 is detachably pressed into a tapered groove at an upper end of the supporting valve plate 303. The pressure plate 305 is detachably mounted on the pressure surface of the convex sealing ring 304, and a sealing ring is disposed between the pressure plate 305 and the sealing rod 301 to ensure the tightness between the pressure plate 305 and the sealing rod 301 after assembly. A detachable flat gasket 307 is disposed on an upper end face of the pressure plate 305, which is conducive to improving the stability of the sealing performance of the valve plate with a convex sealing structure assembled in combination, and finally the flat gasket 307, the pressure plate 305, the convex sealing ring 304 and the supporting valve plate 303 are fastened to the internal threads of the sealing rod 301 by screws. As the above parts are all detachable and easy for installation and removal, the convex sealing ring 304 is easy for replacement in case of failure, and other spare parts except the sealing ring may be reused, thus saving resources.

Figure 12:
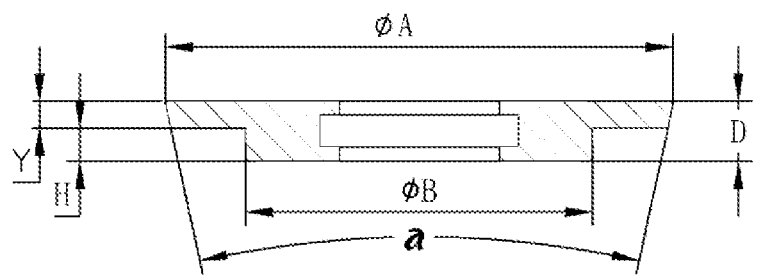
FIG. 12 is a sectional view of a pressure plate of the valve plate with an assembled convex sealing structure.
Figure 13:
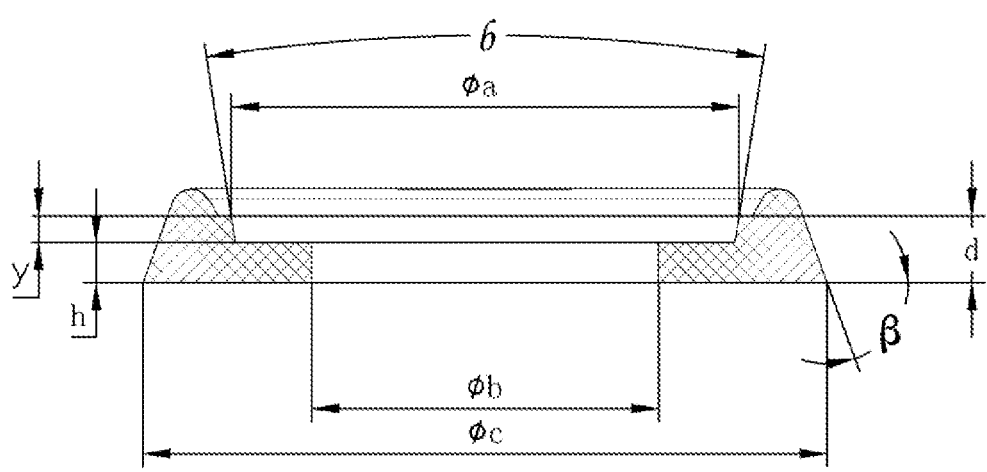
FIG. 13 is a sectional view of a convex sealing ring of the valve plate with an assembled convex sealing structure.

As shown in FIGS. 12 and 13, a pressure cone of the pressure plate 305, with its maximum outer diameter ØA being slightly greater than the maximum inner diameter Øa of an inner cone of the convex sealing ring 304 and its angle ∠α being equal to the angle ∠b of the inner cone of the convex sealing ring 304, is detachably mounted on the inner cone of the convex sealing ring 304, thus ensuring that the sealing ring can be compressed tightly and sealed at the same time by using the cone after assembly.

As shown in FIGS. 12 and 13, a radial supporting plane of the pressure plate 305, with its diameter ØB being slightly greater than the diameter Øb of an inner diametral plane of the convex sealing ring 304, is detachably mounted within the inner diametral plane of the convex sealing ring 304, thus ensuring that the sealing ring can be supported and sealed at the same time by using the cone.

As shown in FIGS. 12 and 13, the pressure plate 305 is required to have a thickness Y equal to a thickness y of the convex sealing ring 304, the pressure plate 305 is required to have a thickness H less than the thickness h of the convex sealing ring 304, and the convex sealing ring 304 with the thickness h is required to have a compression amount not less than 20% after assembly, so as to ensure the tightness of the pressure surface of the sealing ring after assembly and the stability during the assembly of the entire sealing ring.

Figure 14:
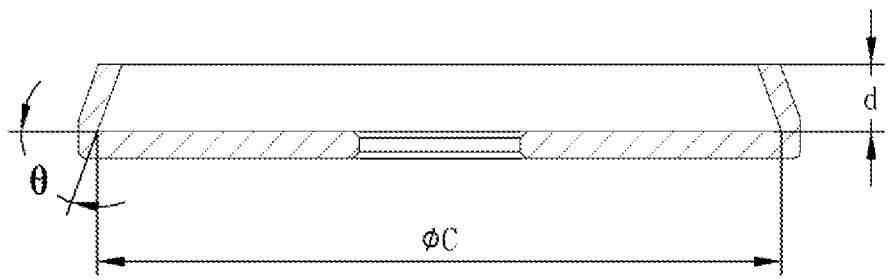
FIG. 14 is a sectional view of a supporting valve plate of the valve plate with an assembled convex sealing structure.

As shown in FIGS. 13 and 14, an angle ∠β of an outer cone of the convex sealing ring 304 is equal to an angle ∠θ of a supporting cone in the groove of the supporting valve plate 303, and the outer cone of the convex sealing ring 304 has a maximum outer diameter Øc slightly greater than a maximum inner diameter ØC of the supporting cone in the groove of the supporting valve plate 303, so as to ensure the tightness of the outer cone of the sealing ring after assembly.

According to Embodiment 2 of the valve plate with an assembled convex sealing structure as shown in FIG. 11, the valve plate is assembled in combination. An annular part surface is fixed at an appropriate position of one end of the sealing rod 301 which is machined with external threads. The convex sealing ring 304 is detachably pressed into a tapered groove at an upper end of the supporting valve plate 303 to form a seal assembly, and then the seal assembly is mounted on the annular part surface fixed on the sealing rod 301. In this way, the assembling is easier. The pressure plate 305 is detachably mounted on the pressure surface of the convex sealing ring 304, and a sealing ring is disposed between the pressure plate 305 and the sealing rod 301 to ensure the tightness between the pressure plate 305 and the sealing rod 301 after assembly. A detachable flat gasket 307 is disposed on an upper end face of the pressure plate 305, which is conducive to improving the stability in the sealing performance of the valve plate with a convex sealing structure assembled in combination. On an upper end face of the flat gasket 307, the pressure plate 305, the flat gasket 307, the convex sealing ring 304 and the supporting valve plate 303 are fastened to an external thread of the sealing rod 301 with nuts. As the above parts are all detachable and easy for installation and removal, the convex sealing ring 304 is easy for replacement in case of failure, and other spare parts except the sealing ring may be reused, thus saving resources.

According to the present invention, the operating principle is as follows: When the apparatus of the present invention is in a shutdown state, the first and second vent valve assemblies are controlled by the thrust force of the first spring 34 and the second spring 44, respectively, to seal the first vent hole 39 and the second vent hole 49 separately, thus preventing the inner chambers of the first drying cylinder 5 and the second drying cylinder 6 from opening to the atmosphere.

When air is introduced into the dryer, the inner chambers of the first drying cylinder 5 and the second drying cylinder 6 take in air simultaneously, and the solenoid valve 7 is in an off-position. As the second pilot air hole 42 is in a state of enclosed pressure-relief at this moment under the control of the solenoid valve 7, the air is fed to the second drying cylinder 6 when the second vent valve is in a state of air intake. At the same time, the compressed air dried by the second drying cylinder 6 flows through the solenoid valve 7 and the first pilot air hole 32 and enters the first pilot chamber 37 of the first vent valve assembly 3, thus overcoming the pressure of the first spring 34, the first piston seal 33 and a main inlet hole, and driving the first sealing valve plate 35 to seal the first air inlet by the first sealing rod 36; and the air is discharged from the first drying cylinder 5 when first vent valve is in a state of air exhaust.

When the solenoid valve 7 is energized, the first pilot air hole 32 is switched to a state of enclosed pressure relief under the control of the solenoid valve 7, and the air is fed to the inner chamber of the first drying cylinder 5 when the first vent valve is in a state of air intake. At the same time, the compressed air dried by the first drying cylinder 5 flows through the solenoid valve 7 and the second pilot air hole 42 and enters the second pilot chamber 47 of the second vent valve assembly 4, thus overcoming the pressure of the second spring 44, the second piston seal 43 and the main inlet hole, and driving the second sealing valve plate 45 to seal the second air inlet by the second sealing rod 46; and the air is discharged from the second drying cylinder 6 when second vent valve is in a state of air exhaust. By controlling the opening and closing of the solenoid valve 7, the first drying cylinder 5 and the second drying cylinder 6 may be switched actively for purifying the compressed gas, and each drying cylinder may perform a regeneration cycle every time after purification, thus providing a steady flow of compressed air purified for subsequent equipment.

The present invention applies to the field of air purification.

The above embodiments are not limited to the technical solutions thereof, but may be combined with each other to form new embodiments. The above embodiments are only used for describing the technical solutions of the present invention, but not for limiting the technical solutions. Without departing from the spirit and scope of the present invention, all the modification and substitution fall in the scope of claims in the present invention.

What is claimed is:

1. A mutual switching type compressed air purification apparatus, comprising:
   a main intake pipe;
   a main exhaust pipe;
   a first vent valve assembly, having a first inlet hole and a first pilot air hole, and connected to the main intake pipe;
   a second vent valve assembly, having a second inlet hole and a second pilot air hole, and connected to the main intake pipe;
   a first drying cylinder, connected to the first inlet hole of the first vent valve assembly, and having a first air outlet connected to the main exhaust pipe;
   a second drying cylinder, connected to the second inlet hole of the second vent valve assembly, and having a second air outlet connected to the main exhaust pipe; and
   a solenoid valve, having valve cores, and connected to the first pilot air hole of the first vent valve assembly and the second pilot air hole of the second vent valve assembly, for restricting the effect of the pilot air holes and controlling the opening and closing of the vent valves,
   wherein the valve cores of the solenoid valve are switched between a first valve position and a second valve position, such that compressed air is introduced into the first pilot air hole and the second pilot air hole in sequence, and one of the first pilot air hole and the second pilot air hole, into which the compressed air is introduced later, can release pressure to the solenoid valve; and the first air outlet and the second air outlet are communicated with each other through a regeneration pipe.

2. The compressed air purification apparatus of claim 1, wherein, the valve cores comprise a second valve core, the second valve core of the solenoid valve is switched between the two valve positions, such that the compressed air is discharged from compressed air chambers of the second vent valve assembly and the first vent valve assembly in sequence; the air is introduced into one of the compressed air chambers of the second vent valve assembly and the first vent valve assembly and is discharged from the other one.

3. The compressed air purification apparatus of claim 1, wherein the regeneration pipe is provided with a regeneration throttle valve communicated with the solenoid valve.

4. The compressed air purification apparatus of claim 1, wherein the main intake pipe is provided with a multifunctional drying filter.

5. The compressed air purification apparatus of claim 1, wherein, the first drying cylinder and/or the second drying cylinder is a compressed air drying filter cartridge with inner intaking and outer venting, comprising a first cartridge body provided with a second cartridge body and a dust filter element therein, and the first cartridge body is connected to the second cartridge body through an annular base, an annular seal washer and a second cartridge bottom cover disposed in lower interior thereof, and the second cartridge body is provided with an air inlet passage disposed at a bottom thereof; the dust filter element is arranged on a filter element mounting base mounted on a top of the second cartridge body; the dust filter element is mounted above the filter element mounting base, communicated with a top of the second cartridge body, and the second cartridge body is filled with adsorbent to a certain level therein with a cyclone filler; and a gap is provided between the first cartridge body and the second cartridge body, for forming an air outlet passage provided with an air inlet communicated with the dust filter element.

6. The compressed air purification apparatus of claim 1, wherein the first vent valve assembly comprises:
   a first vent chamber, comprising a first pilot chamber communicated with the first pilot air hole, and a first intake chamber through which the main intake pipe is communicated with the first inlet hole;
   a first piston seal;
   a first sealing valve plate;

a first sealing rod, of which one end is connected to the first piston seal located in the first pilot chamber, another end is connected to the first sealing valve plate located in the first intake chamber; and a first spring, coiled around the first sealing rod, and having a bottom end in contact with the first piston seal.

7. The compressed air purification apparatus of claim 6, wherein the second vent valve assembly comprises:

a second vent chamber, having a second pilot chamber communicated with the second pilot air hole, and a second intake chamber through which the main intake pipe is communicated with the second inlet hole;

a second piston seal;

a second sealing valve plate;

a second sealing rod, of which one end connected to the second piston seal located in the second pilot chamber, and another end connected to the second sealing valve plate located in the second intake chamber; and a second spring, coiled around the second sealing rod, and having a bottom end in contact with the second piston seal.

8. The compressed air purification apparatus of claim 7, wherein a first valve core of the solenoid valve is switched between the two valve positions such that the first intake chamber is communicated with and disconnected from a first exhaust pipe, and accordingly, the second intake chamber is communicated with and disconnected from a second exhaust pipe.

9. The compressed air purification apparatus of claim 1, wherein the first vent valve assembly is provided with a first vent hole, the second vent valve assembly is provided with a second vent hole, and the first vent hole and the second vent hole are both communicated with a vent pipe and lead to a vent silencer.

10. The compressed air purification apparatus of claim 6, wherein the first vent valve assembly or the second vent valve assembly comprises a valve plate with a assembled convex sealing structure, the valve plate comprises:

a sealing rod, having a stopper formed thereon the sealing rod;

a supporting valve plate, mounted on the stopper and having a groove at an upper end thereof;

a convex sealing ring, mounted in the groove of the supporting valve plate;

a pressure plate, mounted on a pressure surface of the convex sealing ring; and a detachable fastener, arranged on an upper end face of the pressure plate, for fastening the pressure plate, the convex sealing ring and the supporting valve plate on the sealing rod.

11. The compressed air purification apparatus of claim 7, wherein the first vent valve assembly or the second vent valve assembly comprises a valve plate with a assembled convex sealing structure, the valve plate comprises:

a sealing rod, having a stopper formed thereon the sealing rod;

a supporting valve plate, mounted on the stopper and having a groove at an upper end thereof;

a convex sealing ring, mounted in the groove of the supporting valve plate;

a pressure plate, mounted on a pressure surface of the convex sealing ring; and a detachable fastener, arranged on an upper end face of the pressure plate, for fastening the pressure plate, the convex sealing ring and the supporting valve plate on the sealing rod.

* * * * *